(12) United States Patent
Komamura

(10) Patent No.: US 7,194,460 B2
(45) Date of Patent: Mar. 20, 2007

(54) SEARCH DEVICE, SEARCH SYSTEM, AND SEARCH METHOD

(75) Inventor: Noriyuki Komamura, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 685 days.

(21) Appl. No.: 10/402,159

(22) Filed: Mar. 31, 2003

(65) Prior Publication Data

US 2004/0249790 A1 Dec. 9, 2004

(51) Int. Cl.
*G06F 17/30* (2006.01)
*G06F 7/00* (2006.01)

(52) U.S. Cl. ............................... 707/4; 707/6
(58) Field of Classification Search ............... 707/3, 707/4, 6
See application file for complete search history.

(56) References Cited

U.S. PATENT DOCUMENTS 6,212,517 B1 *   4/2001   Sato et al. ................. 707/5
2001/0047355 A1 * 11/2001   Anwar ....................... 707/5
2002/0161752 A1 * 10/2002   Hutchison .................. 707/3
2003/0028513 A1 *  2/2003   Pawar ........................ 707/1

FOREIGN PATENT DOCUMENTS

| JP | 9-204432 A  | 8/1997 |
| JP | 9-269952 A  | 10/1997 |
| JP | 11-110393 A | 4/1999 |

* cited by examiner

*Primary Examiner*—John Cottingham
*Assistant Examiner*—Kuen S. Lu
(74) *Attorney, Agent, or Firm*—Foley & Lardner LLP

(57) ABSTRACT

A search device, search system and search method extract related words of entered keyword from a related word dictionary file, to display one or more of the related words in a manner to accept selection, to perform search using selected related word keyword including desired number of the related word, and to display a search result. Furthermore, a search device is adapted to retrieve related words of entered keywords extracted from a related word dictionary file and to obtain search result using related word key word including selected related words from the obtained one more related words.

8 Claims, 14 Drawing Sheets

KEYWORD HISTORY DB

| SEARCH HISTORY NO. | KEYWORD HISTORY | | DATE OF SEARCH |
|---|---|---|---|
| 1 | MFP | A1 CORPORATION | 2002. 9. 3 |
| 2 | COLOR-PRINTER | A2 CORPORATION | 2002. 9. 3 |
| 3 | PRINTER | MAKER | 2002. 9. 4 |
| ⋮ | ⋮ | ⋮ | ⋮ |

FIG. 2

LINKED LOCATION REGISTRATION DB

<MFP　A1 CORPORATION>
　⋮
　⋯⋯<http:// A1CORPORATIONHP.com>
　⋯⋯<http:// FANTASY.com>
<COLORPRINTER　A2 CORPORATION>
　⋮
　⋯⋯<http:// CLEANER.com>
　⋯⋯<http:// NEWPRODUCTS.com>
　⋮

FIG. 3

| ENTERED KEYWORD | DERIVATIVES | |
|---|---|---|
| MFP | ☐ COMPOSITE-PRINTER<br>☑ COLOR-PRINTER | |
| A1 CORPORATION | ☐ A4 CORPORATION ☐ A3 CORPORATION<br>☑ A2 CORPORATION | |

[REGISTER] — 44

FIG. 7

```
49 ☑  FREQUENTRY     ~48a
        USED WORDS

49 ☑  DERIVTIVES     ~48b
                              50
49 ☐  SAME GENRE    ~48c
49 ☐  SYNONYMS      ~48d
                           [ OK ]
49 ☐  ANONYMS       ~48e
```

FIG. 10

| SEARCH KEYWORD | RELATED WORD INCLUDED IN EXTRACTION TORGET FILE |
|---|---|
| MFP | 51  NO MATCH |
| A1 CORPORATION | ☐ A4 CORPORATION |
| FREQUENTLY USED WORD | 51 ☐ PRINTER        15 HITS<br>51 ☐ IMAGE           7 HITS |
|  | [ OK ] 52 |

FIG. 11

SEARCH DEVICE, SEARCH SYSTEM, AND SEARCH METHOD

BACKGROUND OF THE INVENTION

The present invention relates to a search device and a search system using a keyword(s) for data retrieval, and a method for the same.

In general, a search system is programmed to use a user entered keyword(s) and search command and seek a variety of files for a match or matches to the keyword. A search result relies upon whether a character string matched with the keyword exists in any of the files.

Thus, even if a target file(s) were among the files sought, a fact of no character string exactly matched with the keyword could inhibit further seek to fetch the file. Another fact of no character string very close to but exactly not identical with the keyword in the target file leads to the similar result of no hit.

Hence, the user has to enter some keyword(s) but the previous one(s) for additional search to retrieve the target file. This reentry of the keyword may sometimes work well to obtain the target file, but if not, or when no appropriate alternative keyword springs up to the user's mind, this becomes a bothering and time-consuming task.

In order to overcome the aforementioned disadvantages of the prior art search system, an improved system has been proposed which is automated in revising a user-entered keyword(s) to repeat the search again. For instance, Japanese Unexamined Patent Publication No. H11-110393 teaches the improved search system where part of the keyword is replaced with some other character string or deleted to perform the automated repeat of the search. Another example is the search system proposed in Japanese Unexamined Patent Publication No. H09-269952 where the keyword entered is divided into a plurality of words, and those words are separately used to repeat the search again.

With these improved search systems, however, it is often the case that the user fails to obtain a retrieved file containing target information, and they cannot be perfect solutions to the aforementioned disadvantages.

SUMMARY OF THE INVENTION

It is an object of the present invention to provide a search device, a search system and a search method that can easily obtain a retrieved file containing target information.

A search system according to the present invention comprises: a first keyword entry unit accepting a first keyword for a search, a related word retrieve unit transferring the first keyword to the related word dictionary database system which extracts related words of a keyword for extracting related words and obtaining one or more words related to the first keyword, a related word selector unit, in response to an instruction from an instruction data entry unit, prompting a user to choose one or more as desired from the related words to the first keyword obtained from the related word retrieve unit so as to produce a second keyword made of all or part of the related words, a search result retrieve unit transferring the second keyword produced by said related word selector unit to a search engine to perform search using a keyword to search for data and obtaining search results from the search engine, and an output unit presenting the search results in a data display.

A first search system according to the present invention comprises: a first keyword entry unit accepting an entry of a first keyword, a related word extraction unit to extract related words of the first keyword from a related word dictionary files, a related word selector unit to display one or more extracted related words in a manner to accept selection and to produce related word keywords comprised of arbitrary number of selected related words, a search unit to search using the produced related word keywords, and a unit displaying search results from the search unit.

A second search system according to the present invention comprises: a first keyword entry unit disposed in a user terminal for accepting a first keyword for a search, a related word dictionary database system connected to the user terminal via network and referring to related word dictionary files for a match(es) with a keyword to extract a word(s) related to the keyword, a related word retrieve unit transferring the first keyword to the related word dictionary database system and obtaining one or more words related to the first keyword, a word selector unit, in response to an instruction from an instruction data entry unit, prompting a user to choose one or more as desired from the related words to the first keyword obtained from the related word retrieve unit so as to produce a second keyword made of the related words chosen by the user, a search engine connected to the user terminal via network and using a keyword to search for data, a search result retrieve unit transferring the second keyword to the search engine and obtaining search results from the search engine, and an output unit presenting the search results in a data display.

A search method according to the present invention comprises: extracting a related word of entered keyword from a related word dictionary files, displaying one or more of the related words in a manner to accept selection, performing search using selected related word keyword including desired number of the related word, and displaying a search result.

BRIEF DESCRIPTION OF THE DRAWINGS

FIG. 2 is a diagram showing an exemplary keyword history database (DB);

FIG. 3 is a diagram showing an exemplary link to registered DB;

FIG. 7 depicts a keyword refining field in the screen, including related words extracted by a related word dictionary DB system during the first search task;

FIG. 10 is a diagram showing another refining field in the screen as a check sheet for related words and frequently used words;

FIG. 11 is a resultant screen of the extraction, including related words and frequently used words extracted by the related word dictionary DB system during the extraction task.

DETAILED DESCRIPTION OF THE INVENTION

Figure 1:
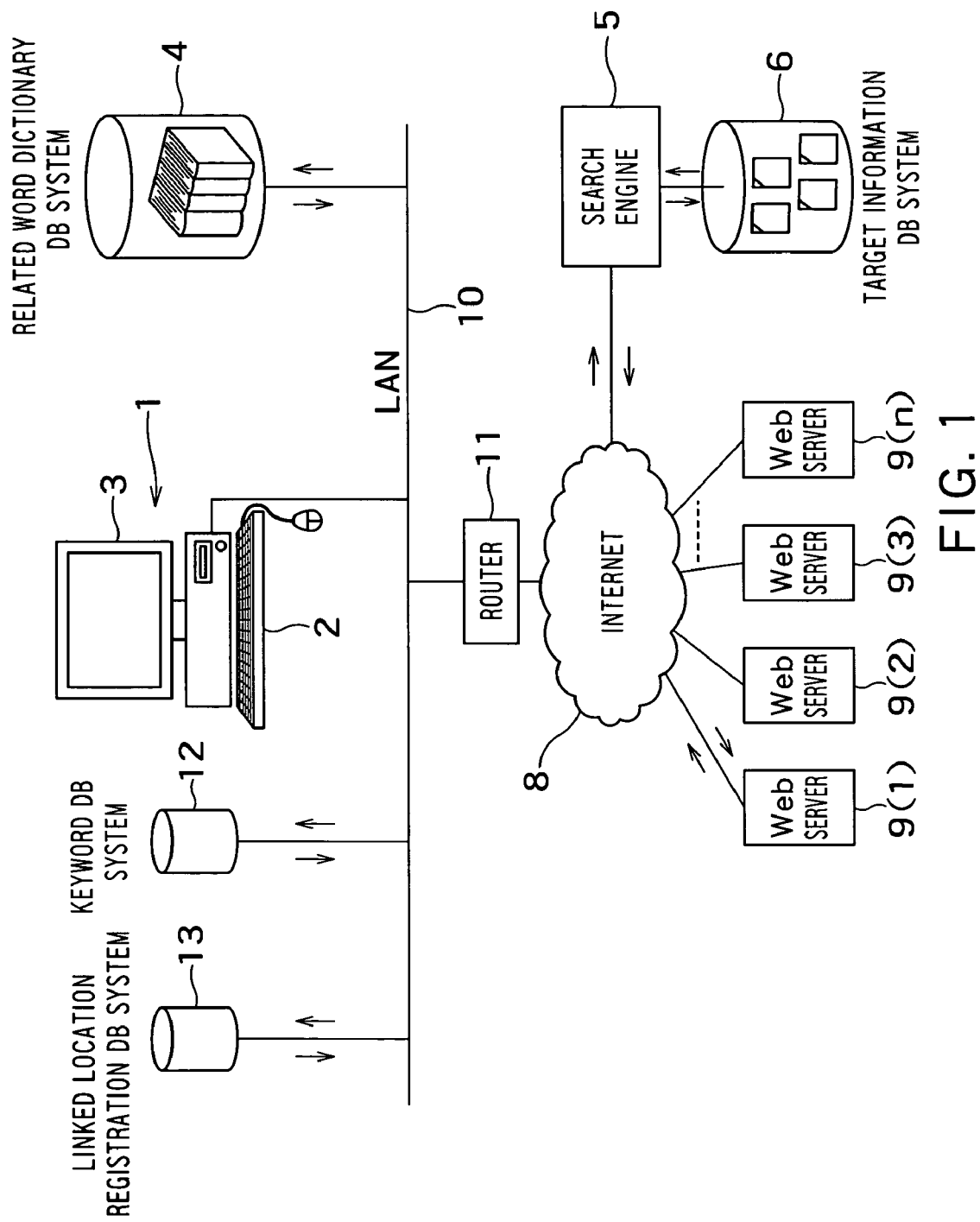
FIG. 1 is a diagram illustrating an embodiment of a search system according to the present invention.

FIG. 1 is a diagram showing an embodiment of a search system according to the present invention.

The search system is adapted to use a user entered keyword(s) to retrieve desired information and further to extract related words to the entered keyword (e.g., derivatives, synonyms, and the like) to prompt the user to choose some from the listed related words for further search. This search system will be detailed below.

A user terminal (search device) 1 uses a user interface (UI) described later (see FIG. 4), which serves to prompt the user to enter various terms for search and to present a display of various search results to the user. The user terminal 1 is comprised of a data entry unit (e.g., a keyboard or/and a mouse) 2, a data display unit 3, and other hardware sources ordinary computers are equipped with, such as a CPU, a RAM, a HDD, an interface unit, and the like (not shown). The HDD (not shown) has application software installed to undertake a search through the search system, and the CPU (not shown) loads the RAM (not shown) with the application software and executes required tasks. The user terminal 1 has its interface unit (not shown) got ready for a connection to LAN 10 in an office, which is to be connected via an intervening router 11 to the Internet 8.

The related word dictionary DB system 4 stores various kinds of related word dictionary files. The related word dictionary DB system 4 determines for what and to what kind of related word dictionary file a reference should be made and extracts a word(s) which is related with a user requested keyword (e.g., the user entered keyword). The related word dictionary files include a thesaurus file for synonyms of the keyword, a glossary file for words in the same genres, a derivative dictionary file for derivatives of the keyword, an anonym dictionary for anonyms of the keyword, and so forth. Any data may be added to or deleted from these related word dictionary files as desired, and a revision of the files is reflected to a state of a display of a dictionary check list 22 (see FIG. 4) which is detailed later. The related word dictionary DB system 4 also functions to extract some designated words (e.g., frequently used words) from target files referred for user's request.

Web servers 9(1) to 9(9) store their respective Web files. The Web files may be HTML files, XML files, and the like, each of which is identified by means of uniform resource identifier (URI) such as uniform resource locator (URL) effective on and with the Internet 8. The Web servers 9(1) to 9(9) respond to requests to extract Web files requested or related to the requests and transfer the files to requesters. For instance, upon receiving a request for a Web file at a certain URI from the user terminal 1, any of the Web servers 9 seeks out a Web file at the URI and sends it to the user terminal 1.

A target information DB system 6 has a target information database containing a plurality of target files that are to be referred to and related URIs which shows locations of sources for the above-mentioned Web files. The target information DB system 6 intervenes in the Internet 8, or alternatively, it may be in the LAN 10 in an office.

A search engine 5 uses a user requested keyword(s) (a keyword for a related word(s) detailed later or the user entered keyword) to search the target files in the target information DB. The search engine 5 extracts the target files containing a match or matches with the user requested keyword and URIs related to the files. Simultaneously, the search engine 5 counts how many hits the search results in. After getting the target files, their respective URIs, and the number of the hits, the search engine 5 returns the results (e.g., the number of the hits, the URIs, etc.) as mentioned below (see a field 33 showing the number of the hits and a field 35 giving the detailed search results).

The search engine 5 also functions to add a new target file and its URI to the target information DB and/or update the existing target file and its URI in the target information DB. Specifically, the search engine 5 periodically (e.g., once every month) circuits the Web servers 9(1) to 9(n) to obtain the Web files and their respective URIs from the Web servers 9. The search engine 5 refers to the target information DB for the obtained URIs to determine if the URIs are innovative. If so, the search engine 5 makes a registration of the obtained Web files and related URIs to add them to a list of the target files. On the contrary, the search engine 5, determining that the obtained URIs already exist among registered ones in the target information DB, compares the contents of the existing target files in the target information DB with the contents of the newly obtained Web files. If it determines that the contents of both the new and existing files are different, the search engine 5 adds the obtained Web files to the existing ones for file update.

A keyword history DB system 12 has a keyword history database that stores a history of all the keywords used for searches in the past by the search engine 5. The keyword history DB system 12 with the keyword history DB functions to aid the user in entering a keyword(s) in a keyword entry box 21 (see FIG. 4); for example, it automatically revises an incomplete entry. One example of the keyword history DB is shown in FIG. 2.

As can be seen in FIG. 2, the keywords used in the past by the search engine 5 are stored in a keyword history domain of the keyword history DB. Times and Dates of searches by the search engine 5 are stored in a search time-record domain while reference numbers for records are stored in an ID history domain. As detailed later, when the user enters data (e.g., part of a keyword(s)) in the keyword entry box 21, the keyword history DB system 12 presents any keyword in the past all or part of which is matched with the data, so as to prompt the user to choose one among them, and the user selected past keyword is automatically entered in the keyword entry box 21 (see FIG. 21) for input assist. This input assist function is detailed later in conjunction with FIGS. 12A to 12C.

A linked location registration DB system 13, in presenting the search results (especially the URIs) on the data display unit 3, functions to display the URIs registered in advance by the user on the higher priority-first basis. Specifically, the linked location registration DB system 13 has a linked location registration database that contains the keywords used in the past by the search engine 5 and related URIs (linked URIs) chosen by the user. An example of the linked location registration DB is shown in FIG. 3.

As depicted in FIG. 3, the linked location registration DB lets a registered keyword "MFP A1 Corporation" be located first and related to two of linked URIs, "http://A1 CorporationHP.com" and "http://FANTASY.com". This proves that a search for the keyword "MFP A1 Corporation" in the past resulted in more than one URIs being extracted and that the user especially related the two URIs "http://A1 CorporationHP.com" and "http://FANTASY.com" with the keyword "MFP A1 Corporation". Once registered in this way, a later search for the user entered keyword "MFP A1 Corporation" results in the extracted URIs being presented on the display unit 3, with the URIs "http://A1 CorporationHP.com" and "http://FANTASY.com" hyperlinked to the keyword "MFP A1 Corporation" being first located prior to any other URIs.

Building of the linked location registration DB and application of the same will be described in more detail later in conjunction with FIGS. 8A and 8B.

Figure 4:
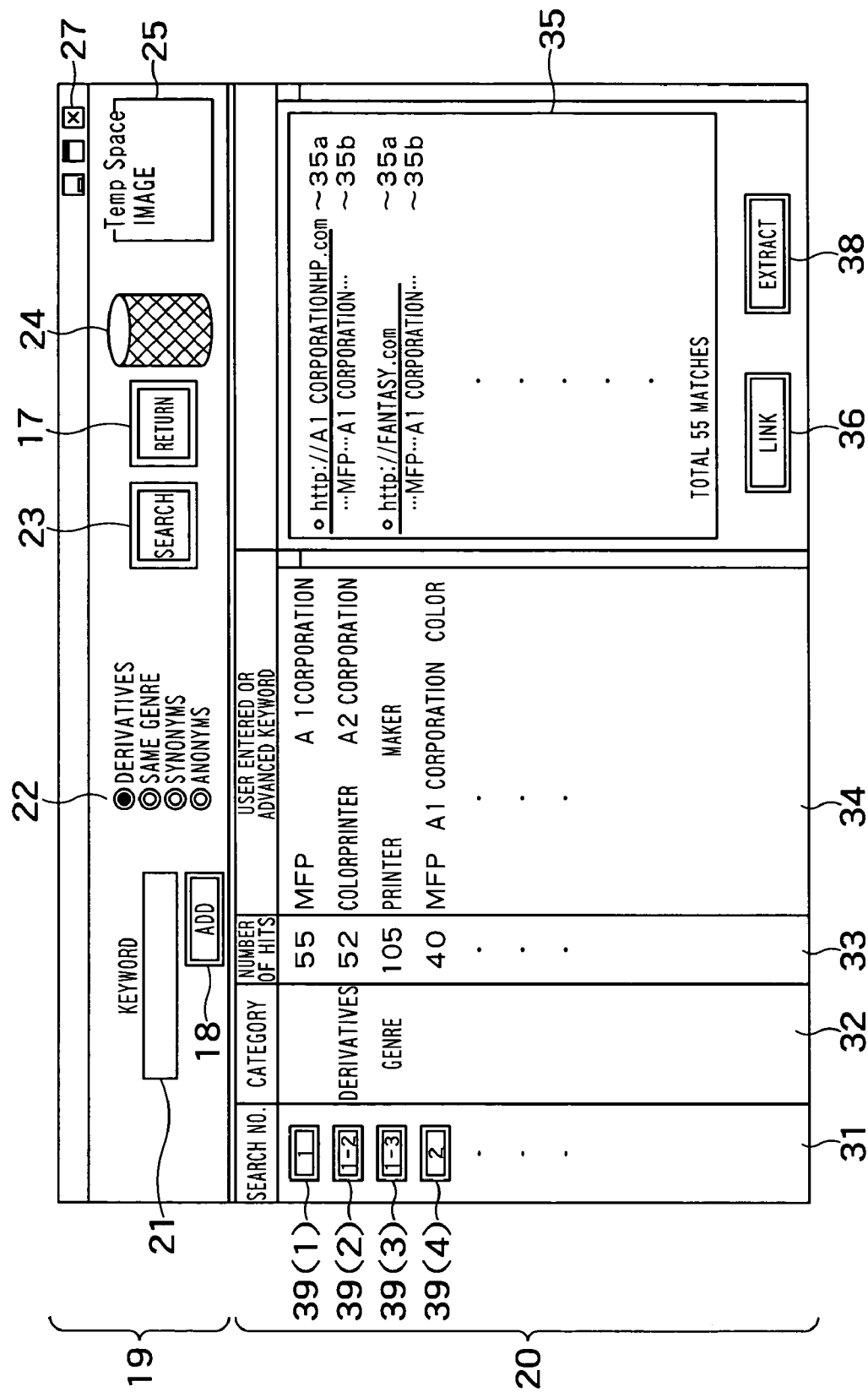
FIG. 4 depicts a user interface (UI) screen presented on a display of a user terminal (search device)
Figure 5:
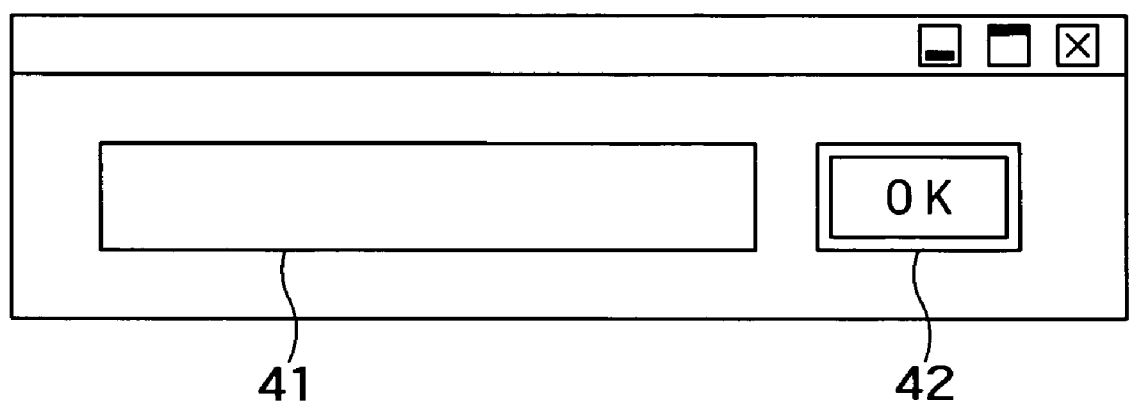
FIG. 5 depicts an empty entry box for a keyword(s) in the screen.

FIG. 4 is a diagram showing a user interface (UI) screen represented on the data display unit 3.

The UI screen is divided into two screen units, namely, a field 19 used for an entry of various search terms by the user and a field 20 used to display various search results. The search term entry field 19 and the search result display field 20 will be detailed below.

First, the search term entry field 19 will be described.

The keyword entry box 21 is an area where one or more words (user entered keywords) having some relation with information required by the user are entered. For instance, if the user requests a Web file(s) containing both the terms "MFP" and "A1 Corporation" in the text, he or she enters "MFP A1 Corporation" in the keyword entry box 21. A space interposed between "MFP" and "A1 Corporation" works as a Boolean conditional AND.

An ADD button 18 is used in entering an additional keyword(s) in the keyword entry box 21. For instance, the user clicks the ADD button 18 to have the user terminal 1 invoke an empty keyword entry field for a new keyword(s). After entering a new keyword(s) in an empty entry box 41, the user clicks an OK button 42 to transfer the newly entered keyword into the keyword entry box 21. The previously entered keyword in the keyword entry box 21 is overwritten. Of course, without using the ADD button 18, the new keyword(s) may simply be reentered in the entry box 21. This means that after deleting the previously entered keyword(s) in the keyword entry box 21, the keyword entry box 21 should be filled with the new keyword(s).

A dictionary select field (radio buttons) 2 serves to designate categories of related word dictionary files for the related word dictionary DB system 4 (see FIG. 1) to extract related words (e.g., derivatives, words in the same genre, synonyms, anonyms). In this embodiment, as shown in FIG. 4, the user can choose some among the derivative dictionary files, the glossary files, the thesaurus files, and the anonym dictionary files. The user designate kinds of the related word dictionaries by applying a check mark to the desired one in the radio buttons 22.

A SEARCH button 23 gives an instruction to start a search to the search system. Thus, clicking the SEARCH button 23, the user can let the search system start a search detailed below (i.e., first to fourth retrieve tasks of the search).

A RETURN button 17 is used to evoke a state one step previous to the current state in the field 35 for detailed search results. For example, while the field 35 presents the second screen next to the first screen, the user clicks the RETURN button 17 to switch the representation in the field 35 one step previous to the current, namely, to the first screen.

A wastebasket 24 serves to delete useless data displayed on the UI screen by using a mouse. For example, the user uses the mouse to drag the data in the keyword entry box 21 and drop it in the wastebasket 24, thereby deleting the data in the keyword entry box 21.

A TEMP space 25 serves to temporarily store a word(s) such as "IMAGE" represented in an extracted result screen detailed later in conjunction with FIG. 11. For instance, when the user manipulates the mouse to drag and drop the word ("IMAGE") in the extracted result screen (see FIG. 11) into the TEMP space 25, the word is kept in the TEMP space 25, as depicted in FIG. 4. This word can be used as an additional user entered keyword, as stated below. For example, dragging to drop the word in the TEMP space 25 in the keyword entry box 21 enables the word to be left in the keyword entry box 21.

A close button 27 serves to close the UI screen. The user who wants to terminate the search clicks the close button 27 to close the UI screen.

The search result display field 20 will now be described.

A field 31 provides buttons 39(1), 39(2), 39(3), 39(4), and so forth that respectively represent reference numerals the user terminal 1 have numbered for each search. The reference number buttons 39 are representations of numerals such as "X" without suffixes or with suffixes like "–Y" as in "X-Y". The "X" proves that the user entered keyword in the entry box 21 was used for a search while the "X-Y" proves that a keyword related to the user entered keyword (advanced keyword) was used for an additional search. Specifically, a reference number "1" is a proof that the user entered keyword "MFP A1 Corporation" in the entry box 21 was used for a search while another reference numeral with a suffix, "1-2" is a proof that an advanced keyword "color-printer A2 Corporation" having some relation with the user entered keyword "MFP A1 Corporation" was used for an additional search. The user can click each of the reference number buttons 39 to trigger some operation as detailed below in terms of Steps S11 to S14 in FIGS. 6A and 6B.

A thematic index field 32 presents categories of related word dictionary files used in extracting related words. For example, "synonyms" in the row of the reference number 1-2 proves that a thesaurus file(s) was used to extract the advanced keyword "color-printer A2 Corporation" related to the user-entered keyword "MFP A1 Corporation". As mentioned above, the reference number "X" denotes the search with the user-entered keyword in the past, and therefore, there is no representation of the related word dictionary file in the row numbered "X" (e.g., in the rows numbered 1 and 2).

The field 33 is an area presenting the number of hits as a result of a search. For instance, an indication of 55 in the row of the reference number 1 means fifty-five extracted data of target files and related URIs as a result of the search for the user entered keyword "MFP A1 Corporation".

A field (keyword display area) 34 presents both user entered and advanced keywords used for searches. For example, representations of the user entered keyword and the advanced keyword in the rows of the reference numbers 1 and 2 respectively prove that "MFP A1 Corporation" and "Color-printer A2 Corporation" were used for the searches in the past. Any word(s) of the user entered or advanced keywords presented in the filed 34 can be copied to the keyword entry box 21 by drag and drop. Thus, several words from more than one keywords can be adequately combined into a new keyword entry.

The field 35 is an area where the detailed search results are presented. The exemplary detailed search results are URIs 35a extracted by the search engine 5 and the keywords and previous or next character data to them ("nearby data") in the text of the target files extracted by the search engine 5. The URIs 35a are hyperlinked, and hence, a click(s) of any of the URIs 35a by the user causes pickup of a Web file at the URI 35a, which is followed by downloading the Web file from the Web server 9 to the user terminal 1. The URIs 35a and their nearby character data are replaced with the contents of the downloaded Web file and represented in the field 35. A click(s) of the RETURN button 17 by the user causes the field 35 to present a screen unit one step previous to the current; that is, the URIs 35a and their respective nearby character data are presented.

A LINK button 36 serves to make a registration of the user's choice among the URIs 35a in the field 35 together with the keyword(s) used to extract the URI 35a, so as to add them to the linked location registration DB (see FIG. 3). For example, the user clicks one of the URIs 35a and downloads a Web file at this URI 35a from the Web server, and then, after reviewing the contents of the Web file, the user may click the LINK button 36 if he or she can have any particular interest in the Web file, so as to complete a registration procedure of adding to the linked location registration DB the URI 35a and the keyword(s) used to invoke it. This link procedure will be detailed later in conjunction with FIG. 8B.

An EXTRACT button 38 functions to let the related word dictionary DB system 4 (see FIG. 1) refer to the target files extracted by the search engine 5 (e.g., fifty-five files for the row of the reference numeral 1) for a word(s) designated by the user and extract frequently used words, related words to the keyword, and/or the like (see FIGS. 10 and 11). For example, when the user cannot obtain the results as he or she desires and besides get any alternative keyword slip to his or her mind, clicking the EXTRACT button 38 enables an extraction of the frequently used words and/or the related words which serve as advanced keywords to continue effective search. This extraction procedure will be detailed later in conjunction with FIG. 9.

Then, the stepwise operation of the search system according to the present invention will be described.

Figure 6A:
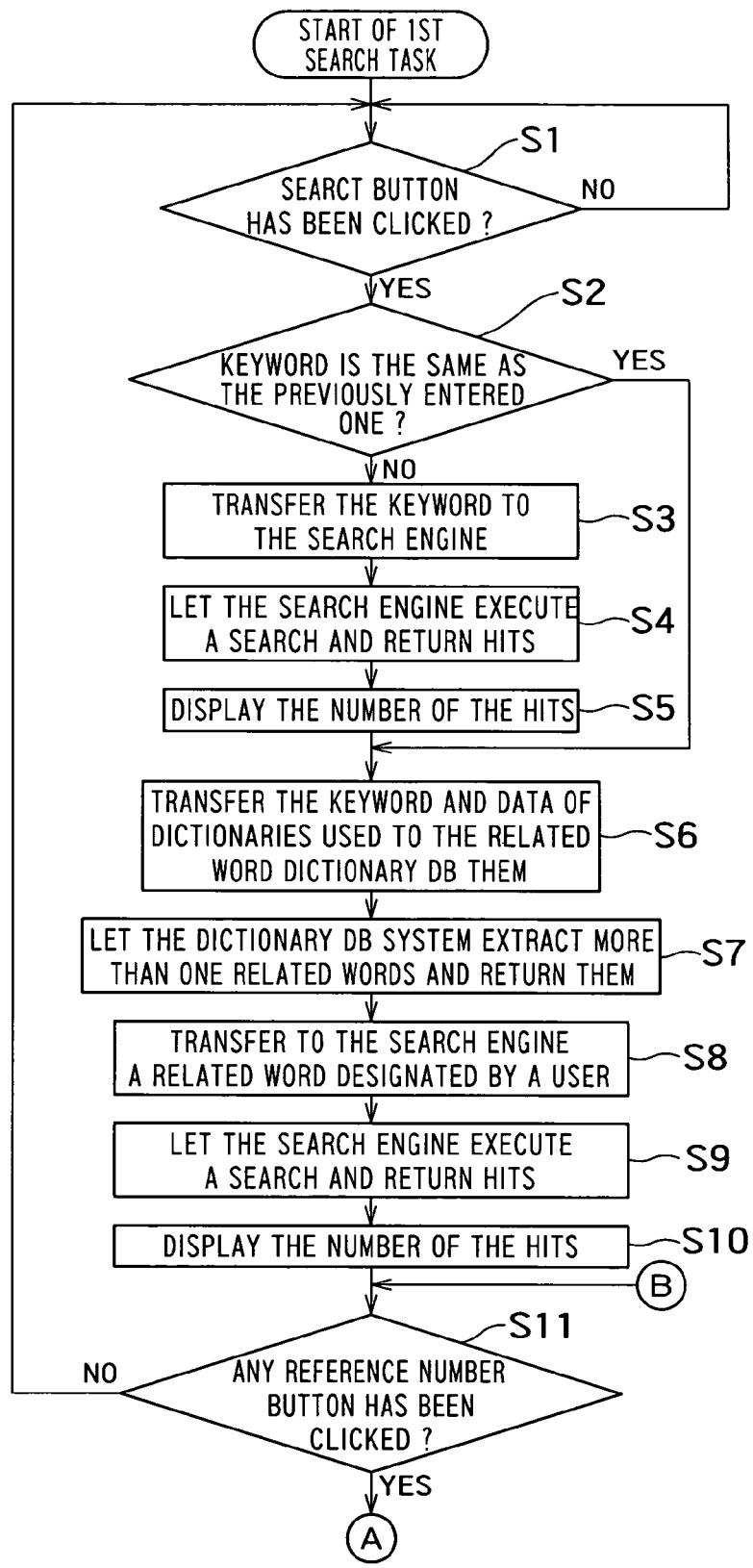
FIGS. 6A and 6B are flowcharts illustrating a stepwise procedure (first search task) of the search system according to the present invention.
Figure 6B:
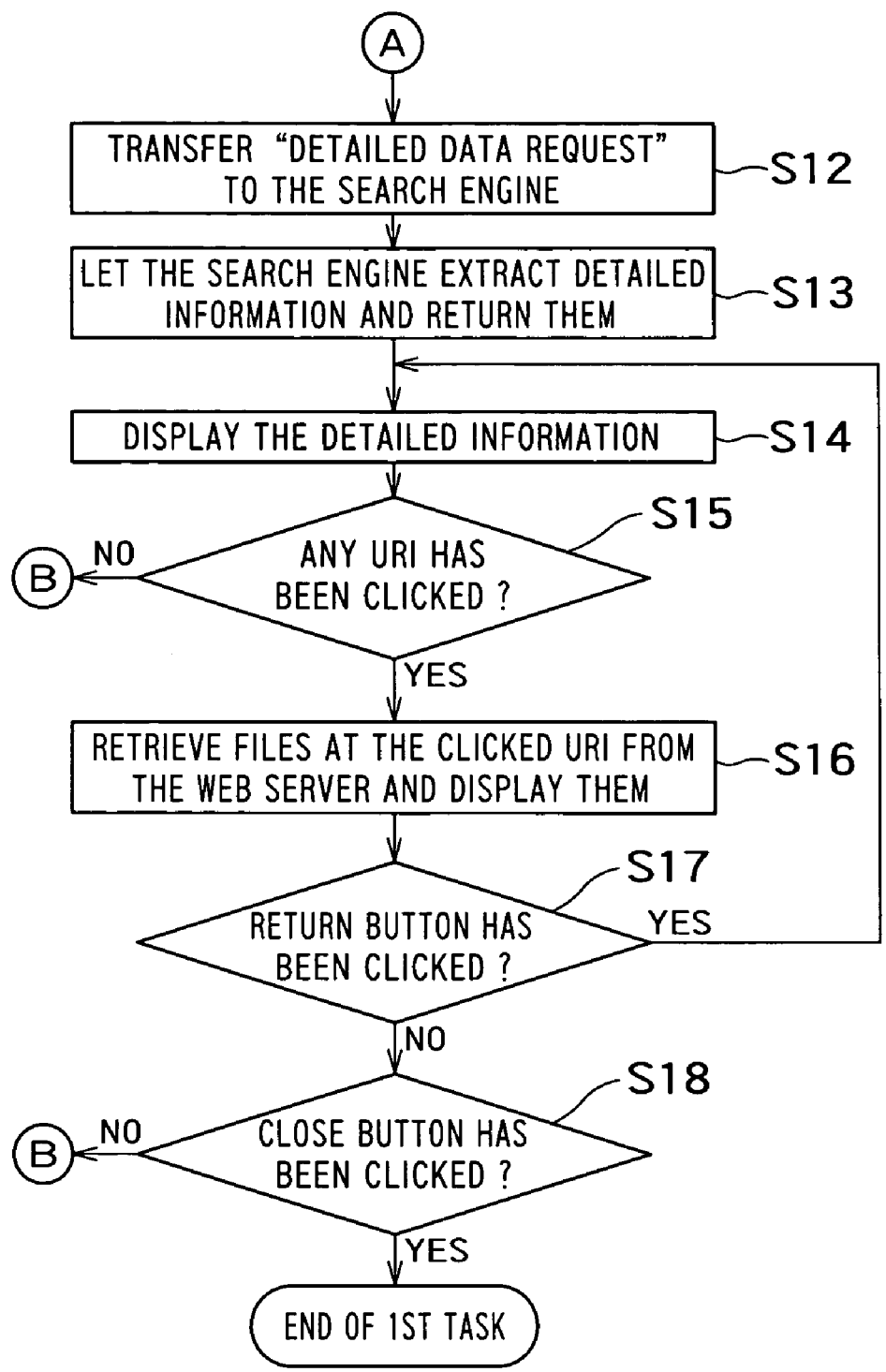

FIGS. 6A and 6B are flowcharts illustrating a steps of a procedure of a first search task by the search system. During the first search task, the linked location registration DB system 13 and the keyword history DB system 12 as in FIG. 1 are not used. The procedure using the linked location registration DB system 13 will be described in the term of the second search task later while the procedure using the keyword history DB system 12 is described in relation with the fourth task of search. Referring to FIGS. 1, 4, 6A and 6B, and 7, the first search task will be described below.

First, as illustrated in Step S1 in FIG. 6A, the user terminal 1 (see FIG. 1) accepts the user entered keyword in the keyword entry box 21 (see FIG. 4) and determines if the user has clicked the SEARCH button 23 after the user checks one or more categories in the dictionary check list 22 for desired related dictionary files (Step S1 in FIG. 6A). The user terminal 1 repeats this procedure till it determines that the SEARCH button 23 has been clicked (NO at Step S1).

The user terminal 1, after determining the SEARCH button 23 has been clicked, tries a matching of the user entered keyword in the entry box 21 with the previously entered keyword (Step S2). This is a test by the user terminal 1 to determine if the user entered keyword in the entry box 21 is totally new or just a revision of the previously entered keyword (Step S2).

When the user terminal 1 determines the current keyword in the entry box 21 is the same as the previously entered keyword (YES at Step S2), the subsequent Steps S3 to S5 are skipped to execute Step S6.

On the contrary, when the user terminal 1 determines that the current keyword in the entry box 21 is not the same as the previously entered keyword (NO at Step S2), it transfers the current keyword to the search engine 5 (see FIG. 1) (Step S3).

The search engine 5, receiving the user entered keyword, uses it to refer to the target information DB for the target files of which text contains the keyword and the URIs related to the files, so as to extract them, and the extracted target files and related URIs are stored in memory not shown (Step S4). Simultaneously, the search engine 5 counts how may hits the search resulted in (the number of the extracted files) (Step S4). The search engine 5 returns only the number of the hits among all the search results including the extracted target files and related URIs, and the number of the extracted files (Step S4).

The user terminal 1, receiving a return of the number of the hits, gives to the fields 33 and 34, respectively, representations of the number of the hits and the user entered keyword used for the latest search and currently in the keyword entry box 21 (see the row of the reference number 1 in FIG. 4) (Step S5). Simultaneous with this, the user terminal 1 creates the button 39 having a reference number to the search and locates the button 39 in the field 31 so as to permit the user to click it (see the row of the reference numeral 1 in FIG. 4) (Step S5).

After displaying the reference number button 39, the number of the hits, and the keyword user for the search in the corresponding fields, respectively, the user terminal 1 transfers to the related word dictionary DB system 4 (see FIG. 1) the keyword in the entry box 21 and the category of related dictionary files chosen in the dictionary check list 22 (data of dictionaries used for the search) (Step S6).

The related word dictionary DB system 4, receiving the keyword and the data of dictionaries used for the search, uses the data to extract and return more than one of the keyword and related words (Step S7)

The user terminal 1, receiving more than one of the keyword and related words, provides a check list of the related words so that the user can choose some (Step S8). The user terminal 1 uses the related words listed and chosen by the user to combine all or part of them into an advanced keyword (Step S8). This step will be detailed below.

FIG. 7 depicts a keyword refining field in the screen, including the related words extracted by the related word dictionary DB system and displayed on the user terminal 1. This refining field shows the results of an extraction where "MFP A1 Corporation" is used as the user entered keyword and the thesaurus dictionary files are chosen to find the related words (see the rows of the reference numbers 1 and 2 in FIG. 4). As a result of the extraction, the keyword refining screen displays "composite-printer" and "color-printer" derived from "MFP" and "A1 Corporation", "A3 Corporation", and "A2 Corporation" derived from "A1 Corporation". The user, while watching the keyword refining screen, selects any number of the related words on the screen to create the advanced keyword. FIG. 7 illustrates the user checking "color-printer" derived from "MFP" and "A2 Corporation" derived from "A1 Corporation". After choosing the related words as desired, the user clicks a REGISTER button 44 to let the user terminal 1 produce the advanced keyword based on the user selected words derived from the original user entered keywords and transfer it to the search engine 5 (Step S8). In the example shown in FIG. 7, "color-printer" and "A1 Corporation" are combined into an advanced keyword "color-printer A2 Corporation", which is transferred to the search engine 5 (Step S8).

The search engine 5, receiving the advanced keyword, uses it to conduct an additional search in the similar manner to the previous search with the user entered keyword, and extracts target files of which text contains the advanced keyword and their respective URIs to store them in the memory not shown (Step S9). Simultaneously, the search engine 5 returns to the user terminal 1 only the count result of hits or the number of matches among other search results of the extracted target files and their respective URIs, and the number of the hits (Step S9).

The user terminal 1, receiving a return of the number of the hits, let the fields 33 and 34 respectively contain the number of the hits and the advanced keyword produced at Step S8 and used for the latest search (see the row of the reference number 1-2 in FIG. 4) (Step S10). Simultaneous with this, the user terminal 1 produces the button 39 labeled with a reference number to the search and display the resultant button 39 in the field 31 (see the row of the reference number 1-2 in FIG. 4) (Step S10). The user terminal 1 further lets the field 32 present the categories of the related word dictionary files chosen in the dictionary check list 22 (see the row of the reference numeral 1-2 in FIG. 4) (Step S10).

As has been described, after correlating the user entered keywords with the advanced keywords and giving the representations of the reference number button 39, the category of the related dictionary files (for the advanced keywords), the number of hits to each of the keywords, and the keywords themselves (see Step S1 to S10), the user terminal 1 determines if any of the reference number buttons 39 in the field 33 has been clicked (Step S11).

The user terminal 1, when determining that none of the buttons 39 has been clicked (NO Step S11), repeats Step S1 again.

On the contrary, determining that one of the buttons 39 has been clicked (YES at Step S11), the user terminal 1 requests the search engine 5 to transfer the detailed search results in relation with the reference number button 39 clicked by the user (Step S12 in FIG. 6B). More specifically, the user terminal 1 transfers to the search engine 5 the keyword in the row of the clicked button 39 and a request for a return of the detailed search results (URIs and text data nearby the keywords) both of which are comprehensively referred to as "detailed data request" hereinafter (Step S12 in FIG. 6B).

The search engine 5, receiving the detailed data request including the keyword, determines if the keyword is the user entered keyword or the advanced keyword (Step S13). The search engine 5, when determining that the returned keyword is the user entered keyword (see the row of the reference number 1 in FIG. 4), refers to the target files extracted and saved at Step S4 (fifty five files in this case) for the keyword and extracts data nearby the keyword (Step S13). The "nearby data" are extracted from a string of data including the keyword and text data previous and subsequent to the keyword (Step S13). The search engine 5 obtains the URIs saved at Step S4 (i.e., fifty five URIs in this case) from the memory which is not shown (Step S13). The search engine 5 returns the extracted "nearby data" and the URIs (as many as the hits) to the user terminal 1 (Step S13). On the contrary, the search engine 5, when determining that the returned keyword is the advanced keyword (see the row of the reference number 1-2), conducts the similar procedure. Specifically, the search engine 5 refers to the target files extracted and saves at Step S9 (fifty two files in this case) for the keyword and extracts data nearby the keyword (Step S13). The search engine 5 obtain the URIs saved at Step S4 (fifty two URIs in this case) from the memory not shown (Step S13). The search engine 5 returns the extracted "nearby data" and URIs (as many as the hits) to the user terminal 1 (Step S13).

The user terminal 1 gives representations of the returned URIs and "nearby data" in the field 35 (see FIG. 4) (Step S14).

The user terminal 1, after displaying the URIs and the "nearby data", determines if any of the URIs has been by the user (Step S15).

The user terminal 1, determining that none of the URIs has not been clicked (NO at Step S15), repeats Step S11 as in FIG. 6A.

On the contrary, determining that one of the URIs has been clicked (YES at Step S15), the user terminal 1 obtains Web files linked to the URI from the server 9 (Step S16). The user terminal 1 presents the contents of the obtained Web files in the field 35 (Step S16). In this way, the representations in the field 35 are replaced with the newly obtained Web files (Step S16).

The user terminal 1, after displaying the contents of the Web files, determines if the RETURN button 17 has been clicked by the user (Step S17).

The user terminal 1, when determining that the RERUTN button 17 has been clicked (YES at Step S17), repeats Step S14. Thus, the user terminal 1 let the URIs and "nearby data" reappear in the field 35.

On the contrary, determining that the RETURN button 17 has not been clicked (NO at Step S17), the user terminal 1 checks if the CLOSE button 27 has been clicked (Step S18).

The user terminal 1, determining that the CLOSE button 27 has not been clicked (NO at Step S18), repeats Step 11 as in FIG. 6A.

On the contrary, determining that the CLOSE button 27 has been clicked (YES at Step S18), terminates the first search task.

A relation of the aforementioned first search task with FIG. 4 will be described.

As can be seen in FIG. 4, the row of the reference number 1 returns the results of the search with the newly entered keyword "MFP A1 Corporation". Thus, this row shows the current state of the first search task after Steps S1 and S2 and subsequent Steps S3 to S5 (see FIG. 6A).

The row of the reference number 1-2 returns the results of the search with the advanced keyword "color-printer A2 Corporation" derived from the user entered keyword "NMFP A1 Corporation". Thus, this row shows the current state of the first search task after Step S5 followed by Steps S6 through S10 (see FIG. 6A).

The field 35 presents the results of the search started with clicking the button 39(1) in the row of the search number 1. Thus, the field 35 provides the current state of the first search task after Step S10 and subsequent steps directed by YES at Step S11, namely, Steps S12 to S14 (see FIG. 6B).

The row of the reference number 1-3 returns the results of the search where the user entered keyword "MFP A1 Corporation" is used as is at its original entry, and the user changes a request for the category of the related word dictionary files from the thesaurus files (see the row of the reference number 1-2 to the glossary for words in the same genre. Thus, the row of the reference number 1-3 shows the current state of the first search task after Steps S14 and S15, and succeeding steps sequentially routed by NO at Step 15, NO at Step S11, YES at Step S1, and YES at Step S2, namely, Steps S6 through S10.

The row of the reference number 2 returns the results of the search with the advanced keyword "MFP A1 Corporation Color" varied from the originally entered keyword "MFP A1 Corporation" (see the row of the reference numeral 1). Thus, the row of the reference number 2 shows the current state of the first search task after Step S10 and subsequent steps sequentially routed by NO at Step S11, YES at Step S1, and NO at Step S2, namely, Steps S3 to S5.

Repetitive execution of the first search task as mentioned above can bring about a simpler and more efficient search, compared with the prior art search system. Besides, alternative procedures as stated below (referred to as "second to fourth tasks of the search", respectively) lead to a further advantageous search. The second to fourth tasks of the search will be explained one by one.

The second search task will first be described. The second search task is a procedure where the aforementioned linked location registration DB system 13 (see FIG. 1) is used.

Figure 8A:
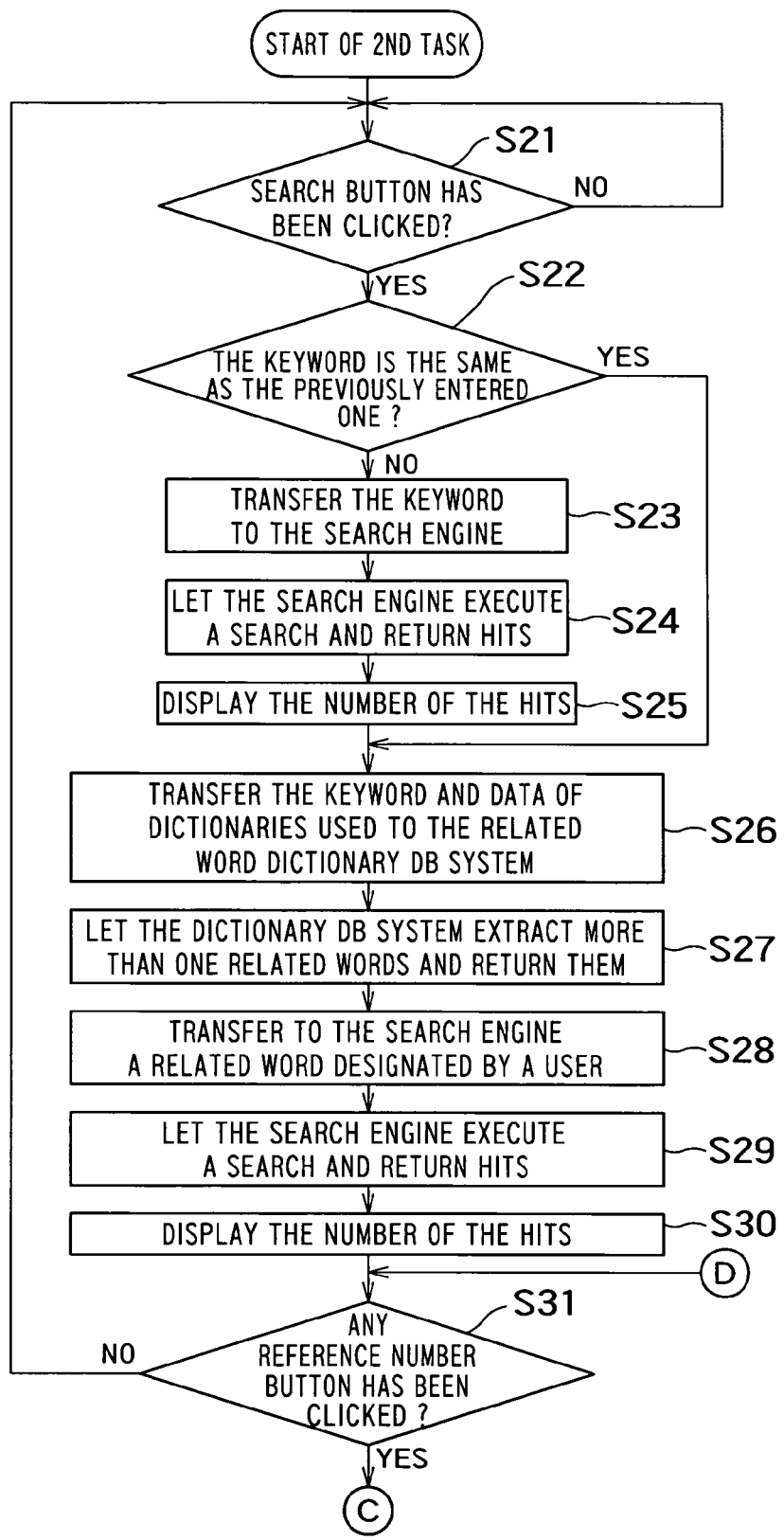
FIGS. 8A and 8B are flowcharts illustrating a second search task.
Figure 8B:
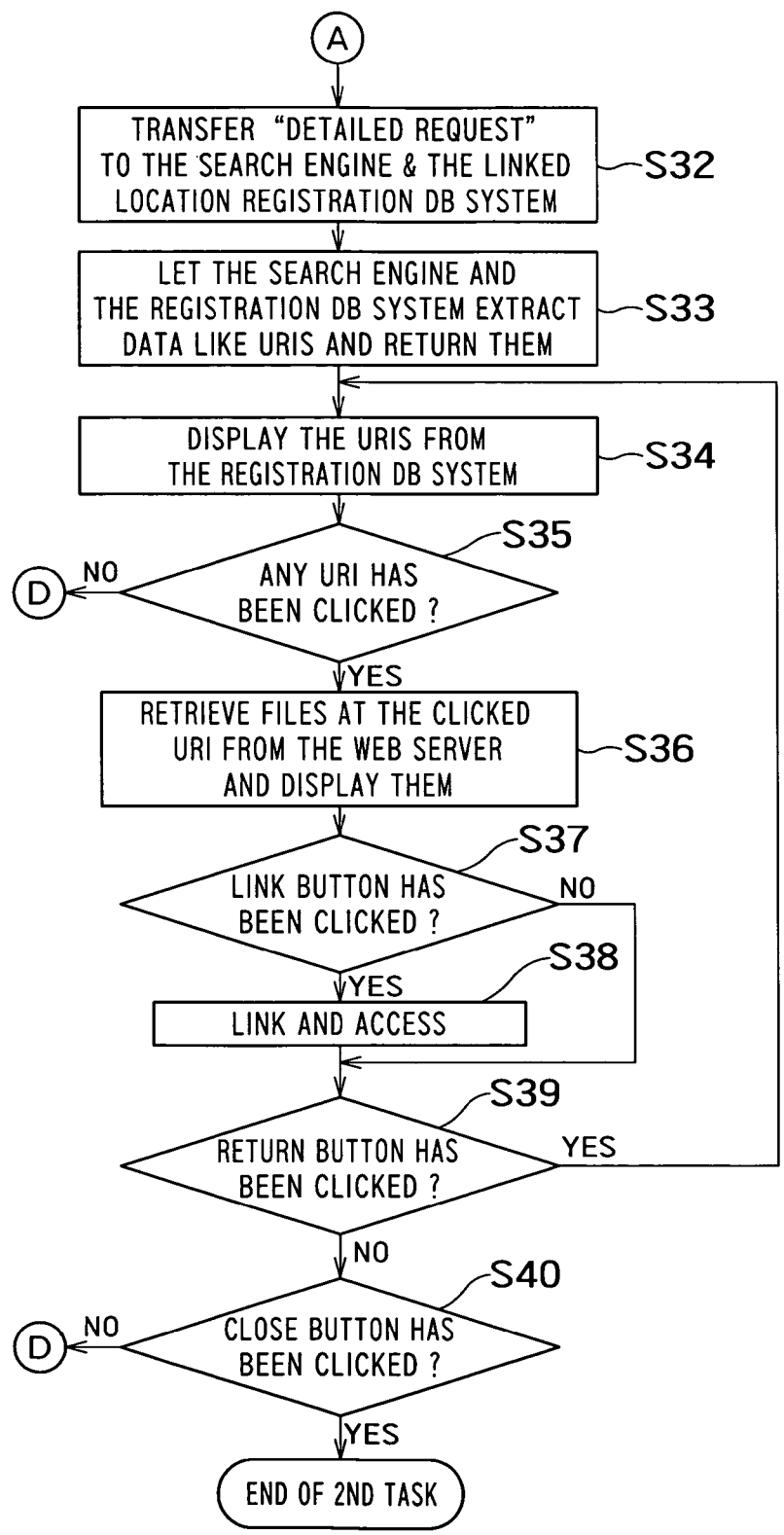

FIGS. 8A and 8B are flowcharts illustrating the second search task. The second search task is designed to locate the extracted URIs as a result of the search by the search engine 5 in the filed 35 in such a manner that the URI earlier added to the linked location registration DB in advance is located first. As mentioned later, registrations of the URIs added to the linked location registration DB are made by the user himself or herself who operates the search system. Thus, the URIs already added to the linked location registration DB are located prior to the remaining URIs so as to get more attention of the user, and the resultant display of the search results can be more useful to the user.

The second search task will be described with reference to FIGS. 1, 3, 4, 6A, 6B, 8A and 8B.

As illustrated in FIG. 8, Steps S21 to S31 are similar to Steps S1 to S11 in the first search task (see FIG. 6A). Hence, after executing Steps S21 to 25, the fields 31, 33 and 34 give respective representations of the reference numeral button 39, the number of hits or matches, and the user entered keyword. Succeeding Step S26 to S30 are then conducted to return representations of the reference number button 39, the related word dictionary used for the search, the number of hits, and the advanced keyword in the fields 31, 32, 33 and 34, respectively. At this point of the procedure, the user terminal 1 determines if any of the reference number buttons 39 has been clicked by the user (Step S31).

Similar to the first search task, the user terminal 1, when determining that one of the reference number button 39 has been clicked (YES at Step S31), transfers to the search engine 5 the "data of request" (i.e., a request for transfer of search results and the keyword used for the search) to request a return of the detailed search results (URIs and data nearby the keyword in the text) as illustrated in FIG. 8B (Step S32). During this task, the "data of request" is also transferred to the linked location registration DB system 13 (Step S32).

Similar to the first search task, the search engine 5, receiving the "data of request", returns the "nearby data" and the URIs (as may as the hits) to the user terminal 1 (Step S33). Simultaneously, the linked location registration DB system 13, receiving the "data of request", refers to the linked location registration database for the keyword included in the "data of request" and extracts linked URIs that are related to the keyword (see FIG. 3). The linked location registration DB system 13 returns the linked URIs extracted in this way, to the user terminal 1, or returns the result of no match if there is no hit in the search (Step S33).

After receiving the "data of request" from the search engine 5 and the linked URIs (or the response of no match if there is none) from the linked location registration DB system 13, the user terminal 1 presents the "data of request" in the field 35 (Step S34). At this time, the user terminal 1 locates the linked URIs first prior to any other URI. If some of the linked URIs are identical to the URIs returned from the search engine 5, the "nearby data" returned together with those URIs from the search engine 5 are displayed along with the linked URIs. If none of the linked URIs are identical to the URIs in the detailed search results from the search engine 5, only the linked URIs are displayed without the "nearby data".

Then, after displaying the "data of request" in the screen, the user terminal 1 determined if any of the URIs has been clicked by the user (Step S35).

When determining that none of the URIs has been clicked (NO at Step S35), the user terminal 1 repeats Step S31 in FIG. 8A.

On the contrary, determining that one of the URIs has been clicked (YES at Step S35), the user terminal 1 obtains Web files at the URI from the Web server 6 (Step S36). The user terminal 1 displays the contents of the obtained Web files in the field 35 (Step S36). The current representation, namely, the URIs and the "nearby data" in the field 35 is replaced with the contents of the Web files obtained in this way (Step S36).

After displaying the contents of the Web files, the user terminal 1 determines if the LINK button 36 (see FIG. 4) has been clicked by the user (Step S37).

The user terminal 1, determining that the LINK button 36 has not been clicked (NO at Step S37), skips Step S38 to execute a succeeding Step S39.

On the contrary, determining that the LINKED button 36 has been clicked (YES at Step S37), the user terminal 1 carries out a link and access as is usually done to a keyword in "Favorite" table on the Internet Explorer® (Step S38). The linked location registration DB system 13 adds the received keyword and URI to the linked location registration DB, hyperlinking the URI (Step S38).

The user terminal 1 then determines if the RETURN button 17 has been clicked by the user (Step S39).

The user terminal, determining that the RETURN button 17 has been clicked (YES at Step S39), repeats Step S34.

On the contrary, determining that the RETURN button 17 has not been clicked yet (NO at Step S39), the user terminal 1 checks if the CLOSE button 27 has been clicked (Step S40).

The user terminal 1, when determining that the CLOSE button 27 has not been clicked (NO at Step S40), repeats Step S31 in FIG. 8A.

On the contrary, determining that the CLOSE BUTTON 27 has been clicked (YES at Step S40), the user terminal 1 terminates the second search task.

When the user cannot obtain search results as he or she desires, he or she gets a word(s) from the extracted target files and use it as an additional keyword to proceed with the search effectively. For example, when words related to the keyword and frequently used words are included in the extracted target files, using these words as a keyword might enable the user to easily access any file containing target information. Thus, described below will be an alternative procedure (a third search task) that includes a step of referring to the extracted target files for the related or frequently used words to extract them (extraction task). The third search task is a sequence of operation steps where the extraction task (see FIG. 9) is additionally interposed between Steps S14 and S15 in the first search task (see FIG. 6B). The third search task will be described below with reference to FIGS. 1, 4, 6A, 6B, 9, 10 and 11, concentrating on the extraction task.

Figure 9:
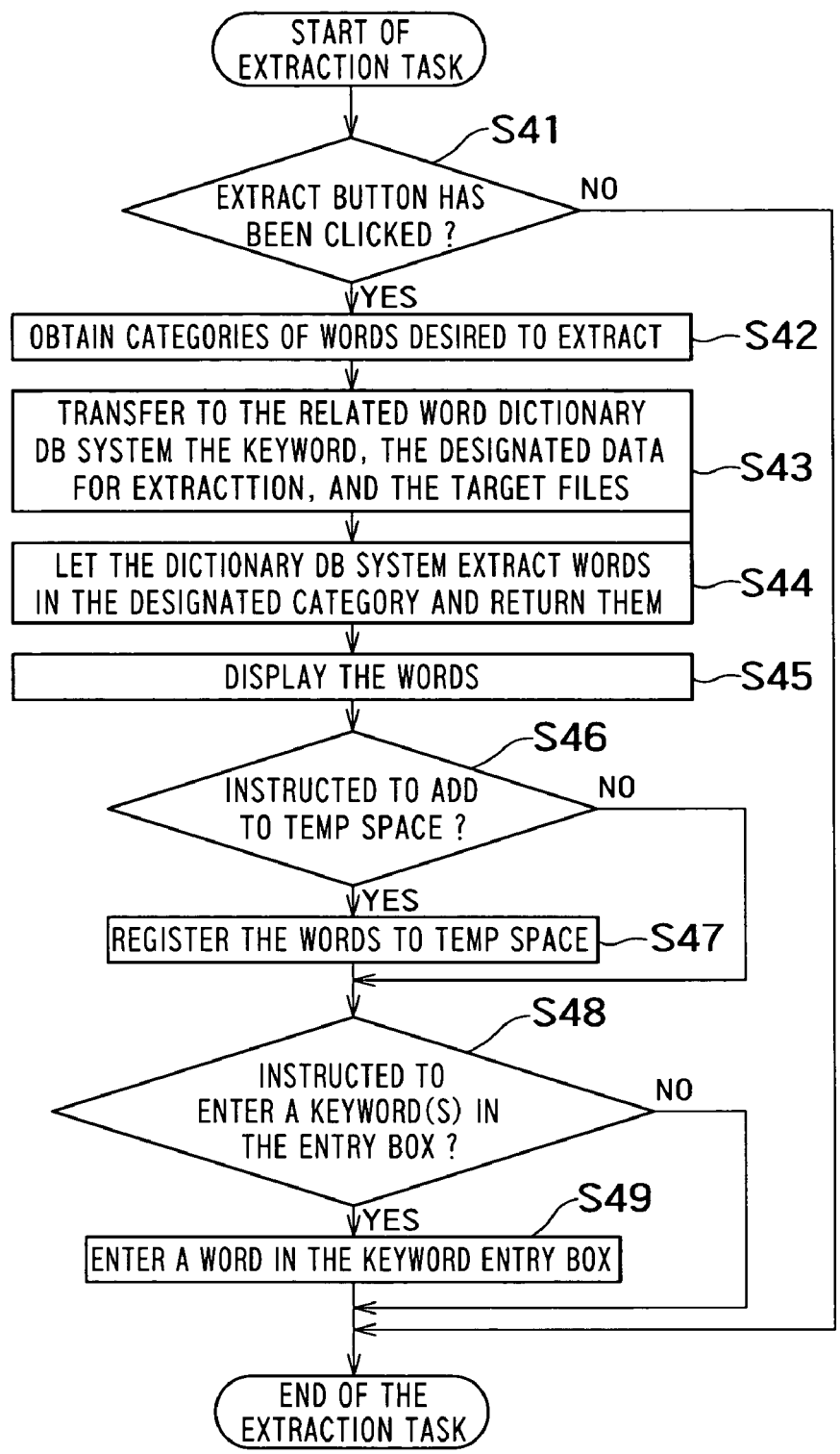
FIG. 9 is a flowchart illustrating an extraction task during the third search task.

FIG. 9 is a flowchart illustrating the extraction task.

As in Step S14 in FIG. 6B, while the detailed search results are presented in the field 35, the user terminal 1 determines if the EXTRACT button 38 (see FIG. 4) has been clicked by the user as in Step S41 in FIG. 9.

The user terminal 1, determining that the EXTRACT button 38 has not been clicked (NO at Step S41), terminates the extraction task and detours to sequentially repeat Step S15 (see FIG. 6B).

On the contrary, determining that the EXTRACT button 38 has been clicked (YES at Step S41), the user terminal 1 provides a screen like a check list (list of words related to the keyword and frequently used words) to prompt the user to choose categories of words for what a reference is made to the target files extracted at Step S4 or Step S9 (Step S42).

FIG. 10 is a diagram showing the screen of a checklist of the related and frequently used words. FIG. 10 gives examples of categories of words for which a search will be made, numbered from 48a to 48e. Frequently Used Words 48a is for words appearing frequently (five times or more) in the text. Derivatives 48b, (Words in the) Same Genre 48c, Synonyms 48d, and Anonyms 48e are for derivatives of the keyword, words in the same genre as that the keyword belongs to, synonyms and anonyms, respectively. Right next to the indications of the categories 48a to 48e are check boxes 49 used to choose any of the categories. With a check mark in one or more of the check boxes, a click of the OK button 50 causes the user terminal 1 to produce instruction data on the categories of words desired to extract (category designation data) (Step S42).

After producing the category designation data, the user terminal 1 transfer to the related word dictionary DB system 4 the produced data along with the keyword (that which is returned with the detailed search results and displayed in the field 35) (Step S43). Additionally, the user terminal 1 gives the search engine 5 an instruction to transfer the extracted target files to the related word dictionary DB system (Step S43). Receiving the instruction, the search engine 5 forwards the extracted target files to the related word dictionary DB system 4 (Step S43). All the xtracted target files may be used as a source to refer to, but instead, the user may have a choice of the files to refer to.

After receiving the category designation data, the keyword, and the extracted target files, the related word dictionary DB system 4 extracts words of the designated categories (see FIG. 10) from the received target files (Step S44). The related word dictionary DB system 4, when determining that the category designation data includes an instruction to extract words related to the keyword (see FIG. 10), uses the related word dictionary files and refers to the received target files to extract the related words to the keyword (Step S44). The related word dictionary DB system 4, when determining that the category designation data includes an instruction to extract frequently used words (see FIG. 10), refers to the received target files to extract words frequently used in the text (e.g., five times or more in total). The related word dictionary DB system 4 returns the extraction results of the related words and/or frequently used words to the user terminal 1 (Step S44).

The user terminal 1 presents a return of the related words and the frequently used words in a screen (Step S45). This procedure will be described in more detail below.

FIG. 11 is an exemplary screen showing the related words and the frequently used words extracted by the related word dictionary DB system 4.

This display in the screen is resulted from a sequential execution of Steps S41 to S45 while the detailed search results with the keyword "MFP A1 Corporation" (see the row of the reference number 1 in FIG. 4) is being displayed (see Step S14 in FIG. 6B). As depicted in FIG. 11, no word related to "MFP" (e.g., synonyms; see FIG. 10) exists in the extracted target files. In contrast, a word related to "A1 Corporation", namely, "A4 Corporation" exists in the extracted target files. As to an example of the frequently used word, "printer" and "IMAGE" exist in the extracted target files.

After displaying the extraction results in the screen, the user terminal 1 determines if the user has given an instruction to add (store) the related words and the frequently used words in the field of the extraction results, to the TEMP space 25 (see FIG. 4) (Step S46). The user terminal 1, when determining no instruction to add those words to the TEMP space 25 (YES at Step S46), skips a next step S47 and executes Step S48. On the contrary, determining it has received an instruction to add the words to the TEMP space 25 (YES at Step S46), the user terminal 1 add the related words and the frequently used words designated by the user to the TEMP space 25 (Step S47). Specifically, the user manipulates a mouse and drags the related words and/or the frequently used words in the filed of the extraction results to drop them in the TEMP space 25, and those words are added (registered) to the TEMP space 25 (YES at Step S46, and Step S47). FIG. 4 illustrates "IMAGE" listed as a frequent used word in the field of the extraction results (see FIG. 11) being left in the TEMP space 25 by means of the drop and drag. The related words and/or the frequently used words added to the TEMP space 25 can be used as a keyword for a next search by the drag and drop into the keyword entry box 21.

The user terminal 1 determines if the user has given an instruction to place some of the related words and the frequently used words from the field of the extraction results (see FIG. 11) into the keyword entry box 21 (Step S48). Specifically, the user terminal 1 determines if the OK button 52 has been clicked while a check mark is added to check boxes 51 next to the listed related words and frequently used words (Step S48). If the user terminal 1 determines that the OK button 52 has been clicked without check mark in any of the check boxes 51 (NO at Step S48), it terminates the extraction task and continuously executes Step S15 (see FIG. 6B). On the contrary, determining that the OK button 52 has been clicked with check marks in some of the check boxes 51(YES at Step S48), the user terminal 1 evokes marked words in the keyword entry box 21 (Step S49).

As has been recognized from the description on the field of the extraction results in the screen (Steps S46 to S49), the user, who has found any of the words related to the current keyword or frequently used words in the field to be appropriate for all or part of an alternative keyword for a next search, may directly enter the related word or the frequently used word in the keyword entry box 21 at Steps S48 and S49. On the contrary, the user, who still has some hesitation at present to use any of the words in the field of the extraction results as the keyword for the additional search, may add and keep the words of his or her concern to any extent in the TEMP space 25 for use in near future at Steps S46 and S47. Any of the related words and frequently used words, once registered in the TEMP space 25, may be placed in the keyword entry box 21 by means of the drag and drop whenever the user wants to use it as all or part of the keyword for a search in future.

As has been described, after the extraction task is terminated, Step S15 (see FIG. 6B) is executed to conduct the same operation as in the first search task (see FIGS. 6A and 6B).

A fourth search task will be described. The fourth search task is a procedure where the keyword history DB system 12 (see FIG. 1) is used to aid the user in entering the keyword in the keyword entry box 21.

Figure 12A:
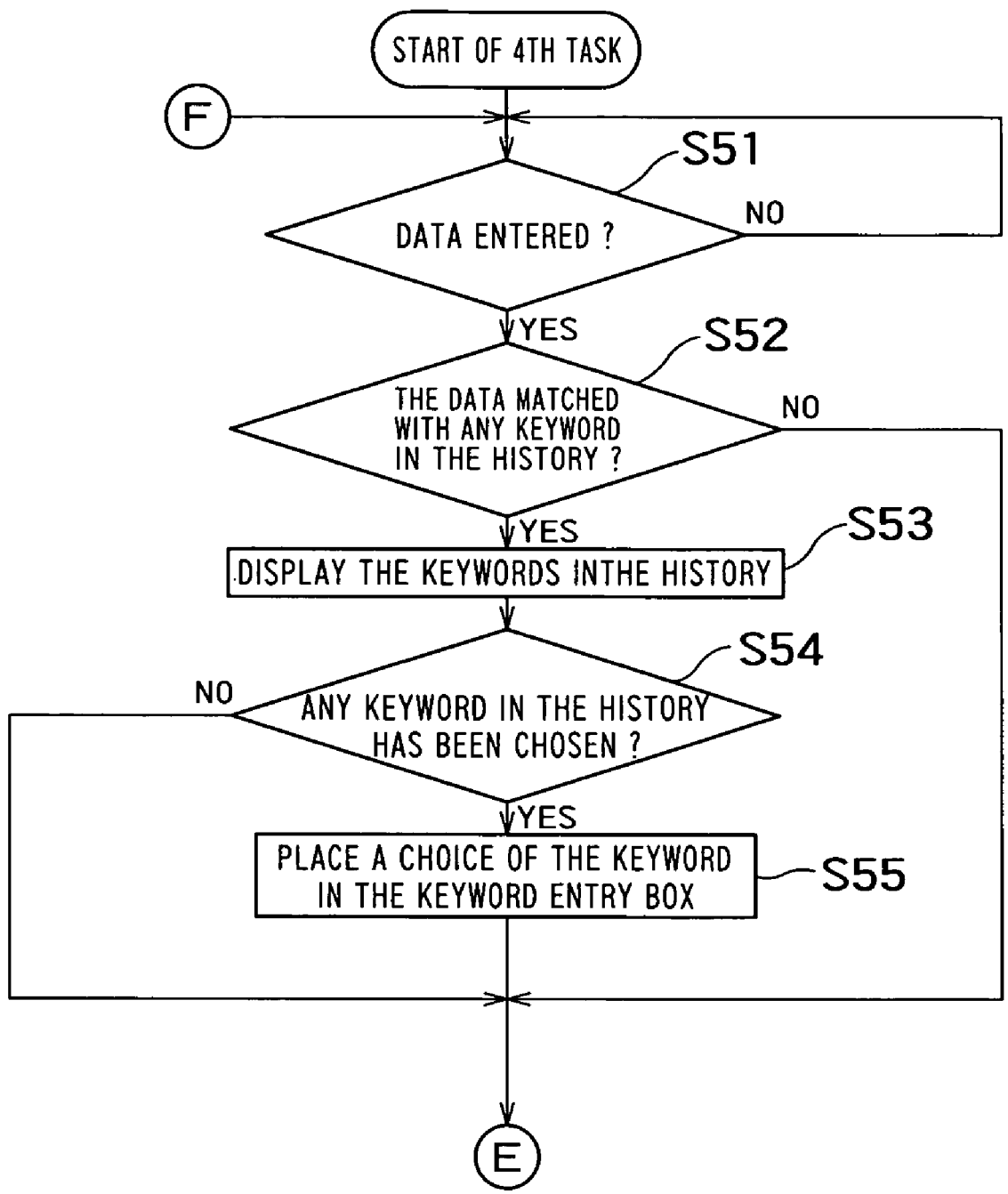
FIGS. 12A to 12C are flowcharts illustrating the fourth search task.
Figure 12B:
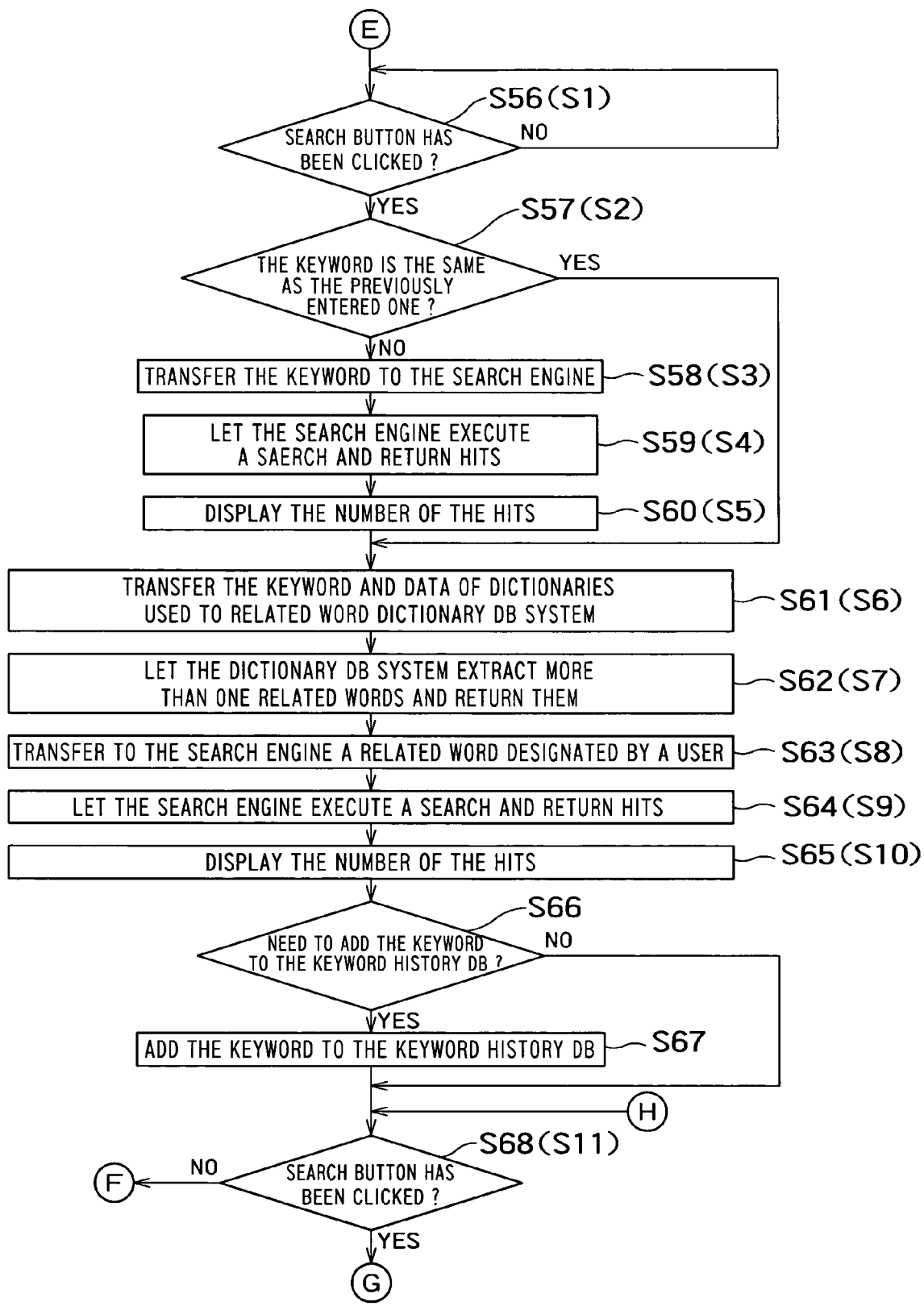
Figure 12C:
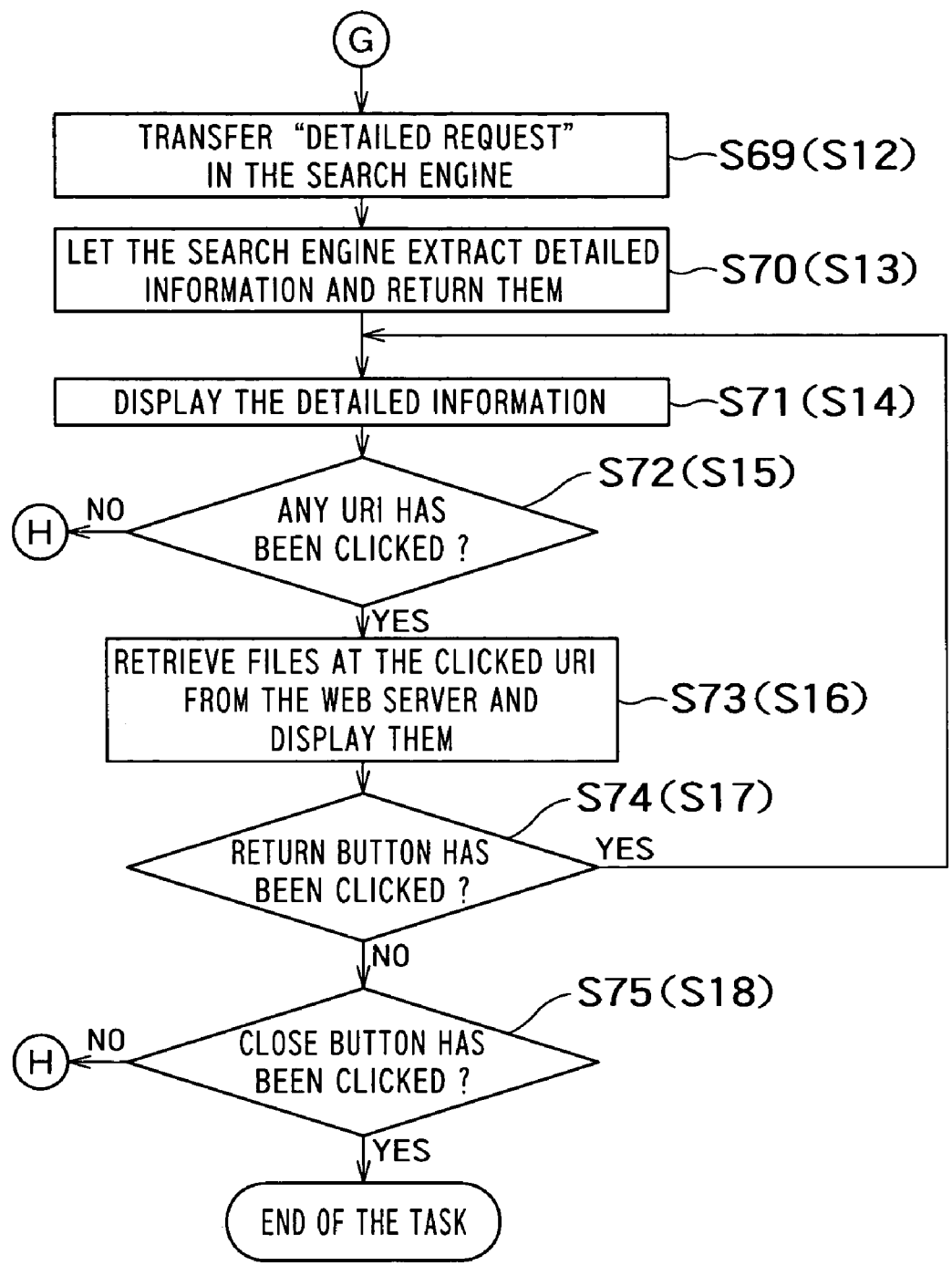

FIGS. 12A, 12B, and 12C are flowcharts illustrating the fourth search task. Two of the flowcharts in FIGS. 12B and 12C are almost the same as those used to illustrate the first search task (in FIGS. 6A and 6B), and any of the counterpart steps to those in the flowchart of the first task has the same reference number in brackets. Exceptionally, the fourth task includes additional Steps S66 and S67 interposed between the counterpart steps to Steps S10 and S11 in the first task (see FIG. 12B), and a direction of the conditional jump in response to "NO" at Step S11 in the first task is different (see FIG. 12B). Moreover, Steps S51 to S55 shown in FIG. 12A are newly added operation to the fourth search task. In conjunction with FIGS. 1, 4, 6A, 6B, and 12A to 12C, the fourth task will be described below.

As in Step S51 in FIG. 12A, the user terminal 1 determines if any data (e.g., part of the user entered keyword) exists in the keyword entry box 21 (Step S51).

The user terminal 1 repeats this iteration till it determines that data has been entered in the keyword entry box 21 (NO at Step S51).

On the contrary, the user terminal 1, when determining that data exists in the keyword entry box 21 (YES at Step S51), transfers the data entered in the keyword entry box 21 to the keyword history DB system 12 (Step S52). The keyword history DB system 12, receiving the entered data, uses it to make a search of the keyword history database (Step S52).

The keyword history DB system 12, determining that any past keyword registered in the search history includes the data currently existing in the keyword entry box 21 (NO at Step S52), does nothing. In this situation, the user terminal 1 determines if the SEARCH button 23 has been clicked by the user (Step S56 in FIG. 12B). The user terminal 1, determining that the SEARCH button 23 has been clicked (YES at Step S56), conducts the same search operation as in the first task (Steps S57 to S68 in FIG. 12B, and Steps S69 to S75 in FIG. 12C). Exceptionally, unlike the first search task, Steps S66 and S67 are executed after displaying the detailed search results, as illustrated in FIG. 12B (see Step S65(S10)).

At Step S66, the user terminal 1 first transfers to the keyword history DB system 12 the user entered keyword and the advanced keyword of a word(s) related to the user entered keyword, and the keyword history DB system 12, receiving both the keywords, determines if the received keywords exist in registered words in the keyword history database. The keyword history DB system 12, when determining that at least one of those keywords is not registered, either the user entered keyword or the advanced keyword related to it, then executes Step S67 (NO at Step S66). At Step S52 (see FIG. 12A), the keyword history DB system 12 determines "NO" (i.e., that any registered keyword used in the past includes the entered data), and hence, it would draws a conclusion tat the entered keyword is not registered yet (NO at Step S66).

Then, at Step S67, the keyword history DB 12 adds to the keyword history database the user entered keyword and/or the advanced keyword related to the user entered keyword that have been recognized as being non-registered words at Step S66 (Step S67). As is apparent from the above, at this time, at least the user-entered keyword is registered (Step S67). Then, dates of the search should be added to the keyword history database (see FIG. 2), and system time installed in the keyword history DB system 12 is used to address this problem (Step S67). After that, Step S68 is executed to conduct the same operation as in the first search task. Exceptionally, at Step S68, a determination is that any of the reference number buttons 39 has not been clicked (NO at Step S68), Step S51 in FIG. 12A instead of Step S56 (S1) is repeated, unlike the first search task.

At the previous Step S52, the keyword history DB system 12, when determining that any of the registered keyword in the keyword history database includes the newly entered data as it part (YES at Step S52), the registered keyword and those previous and subsequent to it in the database (history keyword group) are transferred to the user terminal 1 (Step S53). The user terminal 1 presents the received history keyword group in such a manner as a checklist where the user can choose one or more (Step S53). Specifically, the user terminal 1 displays the history keyword group in a form like a menu extending downward from the bottom side of the keyword entry box 21 (see FIG. 4) (Step S53).

The user terminal 1 determines if any of element word(s) of the displayed history keyword group has been chosen (clicked) by the user (Step S54).

The user terminal 1, when determining that any registered word in the history keyword group has been chosen (YES at Step S54), places the selected keyword in the keyword entry box 21 (Step S55).

The user terminal 1, once placing the selected one of the history keyword group in the keyword entry box 21, determines if the SEARCH button 23 has been clicked by the user (Step S56 in FIG. 12B). The user terminal 1, when determining that the SEARCH button 23 has been clicked (YES at Step S56), conducts the same operation as in the first search task (Steps S57 to S68 in FIG. 12B, and Steps S69 to S75 in FIG. 12C). Exceptionally, determining that the advanced keyword related to the user entered keyword has no match with any registered word in the history keyword database at Step S66 (see FIG. 12B) (NO at Step S66), the keyword history DB system 12 registers the related keyword to the database (Step S67).

On the contrary, determining that any element of the displayed history keyword group has not been chosen at Step S54 (see FIG. 12A) (NO at Step S54), the user terminal 1 checks if the SEARCH button 23 has been clicked by the user (Step S56 in FIG. 12B). The user terminal 1, when determining that the SEARCH button 23 has been clicked (YES at Step S56), conducts the same operation as in the first search task (Steps S57 to S68 in FIG. 12B, and Steps S69 to S75 in FIG. 12C). Exceptionally, determining that the user entered keyword and/or the advanced keyword related to the user entered keyword are not added to the history keyword database at Step S66 in FIG. 12B (NO at Step S66), the history keyword DB system 12 register the keyword(s) in the database (Step S67).

In the aforementioned embodiment of the present invention, although the related word dictionary DB system 4 intervening in the LAN 10 is used to extract words related to the keyword, a related word dictionary site (not shown) located in the Internet 8 and capable of being updated at any occasion may alternatively be used, or otherwise, this dictionary site may be programmed to collaborate with the related word dictionary DB system 4, so as to obtain the related words to the keyword.

In this embodiment, a reference is made to one type of the related word dictionary files to extract the related words, but instead, more than one types of the dictionary files may be used to obtain the related words.

As has been described, in accordance with the present invention, a user entered keyword is used to conduct a search, the user obtains a return of the search results as well as a display of listed words related to the user entered keyword as alternative keywords, and the user chooses some of the alternative keywords to conduct additional searches to get a return of desired search results. This ensures that the user can access data at targeted destinations.

What is claimed is:

1. A search device comprising
a processor,
a first keyword entry unit accepting a first keyword for a search,
a related word retrieve unit transferring the first keyword to the related word dictionary database system which extracts related words of a keyword for extracting related words and obtaining one or more words related to the first keyword,
a related word selector unit, in response to an instruction from an instruction data entry unit, prompting a user to choose one or more as desired from the related words to the first keyword obtained from the related word retrieve unit so as to produce a second keyword made of all or part of the related words,
a search result retrieve unit transferring the second keyword produced by said related word selector unit to a search engine to perform a search using a keyword to search for data and obtaining search results from the search engine, the search result retrieve unit transferring the first keyword to the search engine and obtaining search results including some matches with the first keyword,
an output unit presenting the search results in a data display, the output unit producing the search results using the first keyword in the data display, and
a linked location registration database system where the first and second keywords are related to file identifiers and added to registered keywords as used in the past,
wherein the search result retrieve unit, in response to an instruction from the instruction data entry unit,
transfers to the linked location registration database system the first and second keywords and a return of the file identifiers from the search engine as a result of the search using the first and second keywords, and
lets the linked location registration database system to add these data to the registered ones.

2. A search device according to claim 1, wherein the related word dictionary database system refers to related word source files for the keyword and extracts a word(s) related to the keyword,
the search engine stores a plurality of target files and extracts any of the target files including the keyword in the text to return the search results of the extracted target files to the related word retrieve unit,
the related word retrieve unit transfers to the related word dictionary database system the target files extracted by the search engine along with the first and second keywords and obtains words related to the first and second keywords from the text of the target files, and
the output unit receives the related words to the first and second keywords from the related word retrieve unit and presents them in the data display in such a manner as a check list prompting the user to choose one as an alternative to the first keyword.

3. A search device according to claim 1, wherein the related word dictionary database system extracts words used as frequent as meeting a predetermined norm from the related word source files,
the search engine stores a plurality of target files and extracts any of the target files including the keyword in the text to return the search results of the extracted target files to the related word retrieve unit,
the related word retrieve unit transfers to the related word dictionary database system the target files extracted by the search engine and obtains the frequently used words included in the text of the target files, and
the output unit receives the frequently used words from the related word retrieve unit and presents them in the data display in such a manner as a check list prompting the user to choose one as an alternative to the first keyword.

4. A search device according to claim 1, wherein the search engine returns the search results of the number of hits using the search keyword to the related word retrieve unit, and
the output unit receives from the related word retrieve unit the number of hits and the first and second keywords used for the searches and presents them in the data display in a form of the accumulative number for each search.

5. A search device according to claim 1, further comprising a keyword history database system where the first and second keywords are added to registered keywords as used in the past,
wherein the search result retrieve unit transfers the first and second keywords to the keyword history database system to let it add the first and second keywords to the registered keyword.

6. A search device according to claim 5, wherein the keyword history database system extracts any of the registered keywords including desired data in the text,
the first keyword entry unit transfers an entry data accepted therein to the keyword history database system and obtains the registered keyword including a match with the entry data in the text, and
the data output unit receives the registered keyword from the first keyword entry unit and presents it in the data display in such a manner as a checklist prompting the user to choose one as an alternative to the first keyword.

7. A search device according to claim 1, wherein the linked location registration database system uses the first and second keywords to extract the file identifiers respectively in relation with the keywords,
during search, the search result retrieve unit transfers the first and second keywords to the linked location registration database system and obtains the file identifiers related to the first and second keywords, respectively, and
the data display locates the obtained file identifiers first prior to those returned from the search engine as a result of the search using the first and second keywords.

8. A search device according to claim 1, wherein the linked location registration database system includes a database that stores the keywords used in the past by the search engine and related uniform resource identifiers (URIs) chosen by the user.

* * * * *